(12) United States Patent
Khan et al.

(10) Patent No.: US 11,668,565 B2
(45) Date of Patent: *Jun. 6, 2023

(54) LASER LEVEL

(71) Applicant: Stanley Black & Decker Inc., New Britain, CT (US)

(72) Inventors: Muhammad Bahauddin Khan, Southington, CT (US); Kun Chang, Suzhou (CN); Wei Chen, Jiangsu (CN); Jun Liu, Jiangsu (CN)

(73) Assignee: Stanley Black & Decker Inc., New Britain, CT (US)

( * ) Notice: Subject to any disclaimer, the term of this patent is extended or adjusted under 35 U.S.C. 154(b) by 104 days.

This patent is subject to a terminal disclaimer.

(21) Appl. No.: 17/326,918

(22) Filed: May 21, 2021

(65) Prior Publication Data

US 2021/0278211 A1 Sep. 9, 2021

Related U.S. Application Data

(63) Continuation of application No. 17/089,152, filed on Nov. 4, 2020, now Pat. No. 11,435,181.

(60) Provisional application No. 62/953,277, filed on Dec. 24, 2019.

(51) Int. Cl.
*G01C 15/00* (2006.01)
*H01S 3/02* (2006.01)

(52) U.S. Cl.
CPC ........... *G01C 15/004* (2013.01); *H01S 3/025* (2013.01)

(58) Field of Classification Search
None
See application file for complete search history.

(56) References Cited

U.S. PATENT DOCUMENTS

| | | |
|---|---|---|
| 4,090,306 A | 5/1978 | Darden |
| 4,221,483 A | 9/1980 | Rando |
| 5,012,585 A | 5/1991 | DiMaggio |
| 5,212,889 A | 5/1993 | Lysen |
| 5,459,932 A | 10/1995 | Rando et al. |
| 5,505,000 A | 4/1996 | Cooke |

(Continued)

FOREIGN PATENT DOCUMENTS

| | | |
|---|---|---|
| CN | 201885711 U | 6/2011 |
| CN | 102313542 A | 1/2012 |

(Continued)

OTHER PUBLICATIONS

EP EESR dated, May 19, 2021 in corresponding EP application No. 20215204.7.

(Continued)

*Primary Examiner* — Christopher W Fulton
(74) *Attorney, Agent, or Firm* — Stephen R. Valancius

(57) ABSTRACT

A laser level system including a laser level, the laser level projecting at least one laser line. The system also includes a bracket on which the laser level is mounted and a battery pack. The bracket includes a battery pack receptacle into which the battery pack is removably coupled. The battery pack powers the laser level. The battery pack has a maximum initial battery pack voltage (measured without a workload) of at least 18 volts. The system also includes at least one electrical conductor which delivers power from the battery pack in the battery pack receptacle to the laser level.

20 Claims, 17 Drawing Sheets

(56) References Cited

U.S. PATENT DOCUMENTS

| | | | |
|---|---|---|---|
| 5,524,352 A | 6/1996 | Rando et al. | |
| 5,531,031 A * | 7/1996 | Green | G01C 15/008 33/286 |
| 5,541,727 A | 7/1996 | Rando et al. | |
| 5,619,802 A | 4/1997 | Rando et al. | |
| 5,680,208 A | 10/1997 | Butler et al. | |
| 5,748,306 A | 5/1998 | Louis | |
| 5,992,029 A | 11/1999 | Dong | |
| 6,065,217 A | 5/2000 | Dong | |
| 6,184,979 B1 | 2/2001 | Hirano | |
| 6,293,859 B1 | 9/2001 | Fink et al. | |
| D464,578 S | 10/2002 | Zurwelle | |
| 6,481,684 B1 | 11/2002 | Farmer et al. | |
| 6,568,094 B2 | 5/2003 | Wu | |
| D476,584 S | 7/2003 | Zurwelle | |
| 6,602,122 B1 | 8/2003 | Rudolf et al. | |
| 6,606,798 B2 | 8/2003 | El-Katcha et al. | |
| 6,782,034 B2 | 8/2004 | Li | |
| D498,687 S | 11/2004 | Lopano | |
| 6,915,583 B2 | 7/2005 | El-Katcha et al. | |
| D509,453 S | 9/2005 | Lopano | |
| 7,012,191 B1 | 3/2006 | Watanabe et al. | |
| 7,013,571 B2 | 3/2006 | El-Katcha et al. | |
| D526,587 S | 8/2006 | Lopano | |
| 7,099,000 B2 | 8/2006 | Connolly | |
| 7,152,334 B2 | 12/2006 | Gamal et al. | |
| 7,174,648 B2 | 2/2007 | Long et al. | |
| 7,181,854 B2 | 2/2007 | Long et al. | |
| D538,683 S | 3/2007 | Ishii | |
| 7,191,532 B2 | 3/2007 | Long et al. | |
| 7,260,895 B2 | 8/2007 | Long et al. | |
| 7,266,898 B2 | 9/2007 | El-Katcha et al. | |
| 7,296,360 B2 | 11/2007 | El-Katcha et al. | |
| 7,322,116 B2 | 1/2008 | Long et al. | |
| 7,328,516 B2 | 2/2008 | Nash et al. | |
| 7,392,592 B2 | 7/2008 | Bublitz et al. | |
| 7,513,052 B2 | 4/2009 | Milligan et al. | |
| 7,523,558 B2 | 4/2009 | Milligan et al. | |
| 8,333,252 B2 | 12/2012 | Britz et al. | |
| 8,366,065 B2 | 2/2013 | Kane, Jr. et al. | |
| 8,496,074 B2 | 7/2013 | Nishikimi et al. | |
| 8,511,635 B2 | 8/2013 | Steffen | |
| 8,519,861 B2 | 8/2013 | Sergyeyenko et al. | |
| 8,668,182 B2 | 3/2014 | Steffen et al. | |
| 8,708,063 B2 | 4/2014 | Nagasaka et al. | |
| D731,872 S | 6/2015 | White | |
| 9,255,798 B2 | 2/2016 | Kahlow | |
| 9,463,565 B2 | 10/2016 | Nagasaka et al. | |
| 9,534,731 B2 | 1/2017 | White | |
| 9,637,942 B2 | 5/2017 | White | |
| 9,660,374 B2 | 5/2017 | Baudelocque et al. | |
| 9,718,172 B2 | 8/2017 | Sakamaki et al. | |
| 9,803,794 B2 | 10/2017 | White | |
| 9,833,890 B2 | 12/2017 | Ito et al. | |
| 10,040,178 B2 | 8/2018 | Kondo et al. | |
| 10,119,817 B2 * | 11/2018 | Spaulding | G01C 15/002 |
| 10,184,794 B2 | 1/2019 | Ishikawa et al. | |
| 10,304,429 B1 | 5/2019 | Broadbelt et al. | |
| 10,321,596 B2 * | 6/2019 | Oguchi | H05K 5/0247 |
| 10,363,614 B2 | 7/2019 | Noreen | |
| 10,378,739 B2 | 8/2019 | Harvey et al. | |
| 10,620,007 B2 * | 4/2020 | Ishikawa | G01C 15/004 |
| 11,435,181 B2 * | 9/2022 | Khan | H01S 3/025 |
| 2005/0172502 A1 | 8/2005 | Sergyeyenko | |
| 2005/0278966 A1 | 12/2005 | Liu | |
| 2006/0048399 A1 | 3/2006 | Chang | |
| 2006/0185181 A1 | 8/2006 | Long | |
| 2007/0227017 A1 | 10/2007 | Milligan | |
| 2008/0020634 A1 | 1/2008 | Taniguchi et al. | |
| 2009/0100691 A1 | 4/2009 | Lu | |
| 2011/0303808 A1 | 12/2011 | Bileth | |
| 2013/0243538 A1 | 9/2013 | Hu et al. | |
| 2014/0196945 A1 | 7/2014 | Kato | |
| 2015/0309395 A1 | 10/2015 | Tomasewski | |
| 2016/0377431 A1 | 12/2016 | Kahlow | |
| 2018/0098445 A1 | 4/2018 | Oguchi | |
| 2019/0113340 A1 | 4/2019 | Ishikawa et al. | |
| 2021/0278211 A1 * | 9/2021 | Khan | G01C 15/004 |

FOREIGN PATENT DOCUMENTS

| | | |
|---|---|---|
| CN | 204575076 U | 8/2015 |
| EP | 1235051 A2 | 8/2002 |
| JP | 2017035762 A | 2/2017 |
| WO | 2012075693 A1 | 6/2012 |

OTHER PUBLICATIONS

Pictures of Prior Art Bosch Laser Brackets, including Bosch Positioning Device BM1: https://www.boschtools.com/us/en/boschtools-ocs/positioning-devices-ceiling-clips-bm1-51067-p/.

Prior Art Dewalt 12V MAX Battery packs DCB122/DCB124/DCB125/DCB127 weighing approximately 212 grams (https://www.dewalt.com/products/accessories/batteries-and-chargers/batteries/12v-max-30ah-lithium-ion-battery/dcb124—website accessed Apr. 9, 2021).

Prior Art Dewalt 20V MAX 1P Battery Packs DCB203/DCB207 weighing approximately 412 grams (https://www.dewalt.com/products/accessories/batteries-and-chargers/batteries/20v-max-compact-lithium-ion-battery-pack/dcb203—website accessed Apr. 9, 2021).

Prior Art Dewalt 20V MAX 2P Battery Pack DCB205 weighing approximately 820 grams (https://www.dewalt.com/products/accessories/batteries-and-chargers/batteries/dcb205-20v-max-xr-5ah-battery/dcb205—website accessed Apr. 9, 2021).

Prior Art Dewalt 20V MAX 1P Battery Pack DCB203BT weighing approximately 420 grams (https://www.dewalt.com/products/power-tools/connected-products/20v-max-tool-connect-2ah-battery/dcb203bt—website accessed Apr. 9, 2021).

Prior Art Dewalt 20V MAX 2P Battery Pack DCB205BT weighing approximately 840 grams (https://www.dewalt.com/products/power-tools/connected-products/20v-max-tool-connect-5ah-battery/dcb205bt—website accessed Apr. 9, 2021).

Prior Art Dewalt 20V MAX 1P Battery Pack DCB230 weighing approximately 499 grams (https://www.dewalt.com/products/accessories/batteries-and-chargers/batteries/20v-max-compact-3ah-battery/dcb230—website accessed Apr. 9, 2021).

Prior Art Dewalt 20V MAX 2P Battery Pack DCB206 weighing approximately 940 grams (https://www.dewalt.com/products/accessories/batteries-and-chargers/batteries/20v-max-premium-xr-60ah-lithium-ion-battery-pack/dcb206—website accessed Apr. 9, 2021).

Prior Art Dewalt 20/60V MAX Battery Pack DCB606 weighing approximately 1 kg (https://www.dewalt.com/products/accessories/batteries-and-chargers/batteries/20v60v-max-flexvolt-60-ah-battery/dcb606—website accessed Apr. 9, 2021).

IPrior Art Dewalt 20/60V MAX Battery Packs DCB609/DCB61 weighing approximately 1.2 kgs (https://www.dewalt.com/products/accessories/batteries-and-chargers/batteries/20v60v-max-flexvolt-90ah-battery/dcb609—website accessed Apr. 9, 2021).

Dewalt 12V MAX 3x360 DW089LG: https://www.dewalt.com/products/hand-tools/measuring-and-layout-tools/self-leveling-line-lasers/12v-max--3-x-360-green-line-laser/dw089lg.

Dewalt Catalogue May 2004 Extract.

DW073 Instruction Manual.

DW076 Instruction Manual.

DW076 Product Detail Excerpt.

* cited by examiner

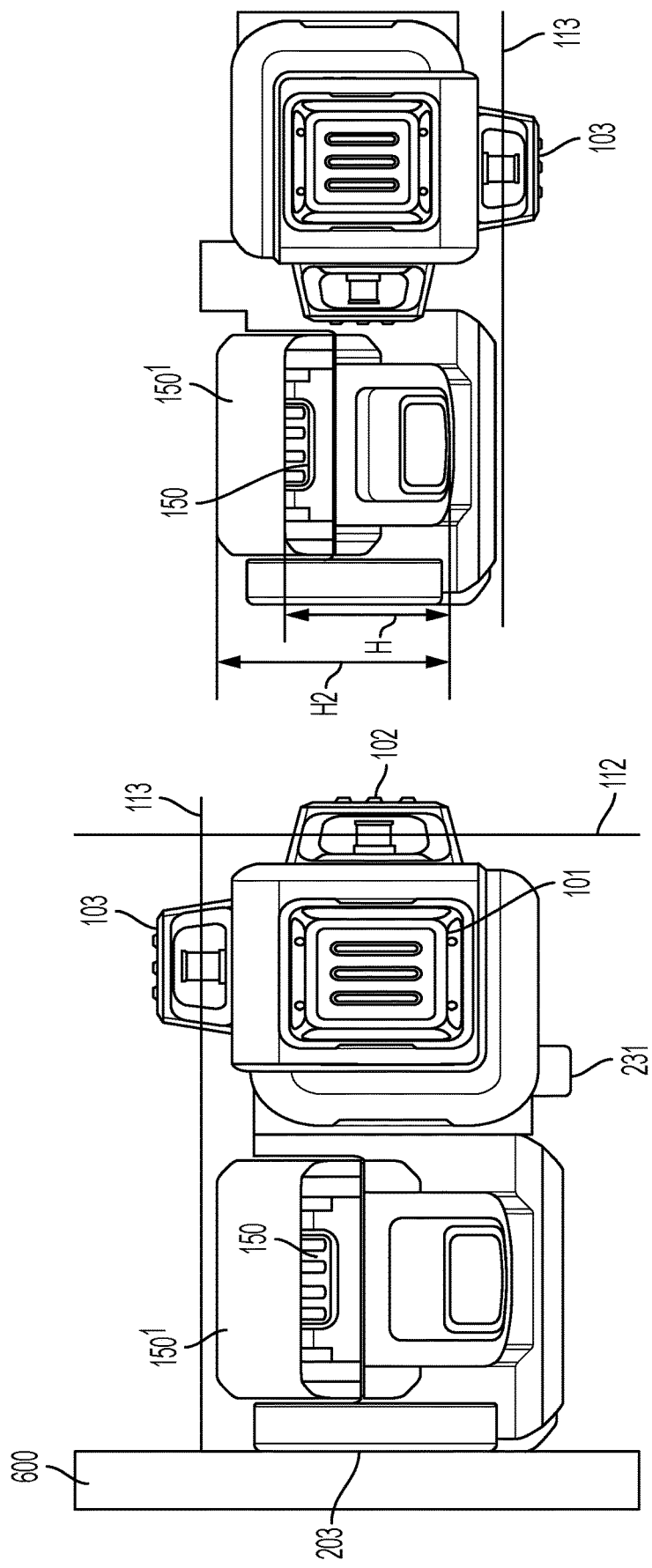

LASER LEVEL

CROSS-REFERENCE TO RELATED APPLICATION

This application is a continuation of U.S. Pat. No. 11,435,181, filed on Nov. 4, 2020, and issuing on Sep. 6, 2022, which claims priority and benefit to U.S. Provisional Application No. 62/953,277 filed on Dec. 24, 2019, the entire contents of each are hereby incorporated herein by reference in their entireties.

FIELD OF THE INVENTION

The present invention relates to laser levels, battery powered laser levels, laser level brackets and laser level systems.

BACKGROUND

There are various existing laser levels and laser level systems. It is desired to provide a laser level with an improved construction.

SUMMARY

According to one aspect, there is an exemplary embodiment of a laser level system, including: a laser level, the laser level projecting at least one laser line; a bracket on which the laser level is mounted; a battery pack; wherein the bracket includes a battery pack receptacle into which the battery pack is removably coupled; wherein the battery pack powers the laser level; wherein the battery pack has a maximum initial battery pack voltage (measured without a workload) of at least 18 volts; and further comprising at least one electrical conductor which delivers power from the battery pack in the battery pack receptacle to the laser level.

The electrical conductor may be a wire.

The battery pack may have a capacity of at least 2.0 amp-hours.

The laser level may be a 3×360 laser level.

The laser level may be a cross-line laser level.

The bracket may include a mounting portion, the mounting portion including a plurality of magnets.

The plurality of magnets may include at least four magnets.

The plurality of magnets each have a rectangular cuboid shape.

The battery pack may have a maximum initial battery pack voltage (measured without a workload) of approximately 20 volts.

According to another aspect, there is an exemplary embodiment of a laser level system including a laser level; a bracket on which the laser level is mounted; a battery pack; wherein the bracket includes a battery pack receptacle into which the battery pack is removably coupled; and wherein the battery pack powers the laser level.

The laser level may project at least one laser line.

The laser level may project at least one laser spot.

The laser level may be a 3×360 laser level.

The laser level may be a cross-line laser level.

The bracket may include a mounting portion, the mounting portion including a plurality of magnets.

The plurality of magnets may include at least four magnets.

The plurality of magnets may each have a rectangular cuboid shape.

The battery pack may have a maximum initial battery pack voltage (measured without a workload) of at least 18 volts.

The battery pack may have a maximum initial battery pack voltage (measured without a workload) of approximately 20 volts.

According to another aspect, there is an exemplary embodiment of a laser level system, the system including a laser level; a bracket; and a battery pack; wherein the bracket includes at least a base portion, a battery pack receptacle portion and a mounting portion; wherein the laser level is mounted to the base portion; wherein the battery pack is removably coupled to the battery pack receptacle portion; and wherein the mounting portion includes at least four magnets; wherein the at least four magnets have a rectangular cuboid shape; wherein the battery pack powers the laser level; and wherein the battery pack has a maximum initial battery pack voltage (measured without a workload) of at least 18 volts.

BRIEF DESCRIPTION OF THE DRAWINGS

FIG. 14 is a top view of an exemplary embodiment of a laser level system according to the present application;

FIG. 15 is a top view of an exemplary embodiment of a laser level system according to the present application;

DETAILED DESCRIPTION OF EXEMPLARY EMBODIMENTS

Figure 1:
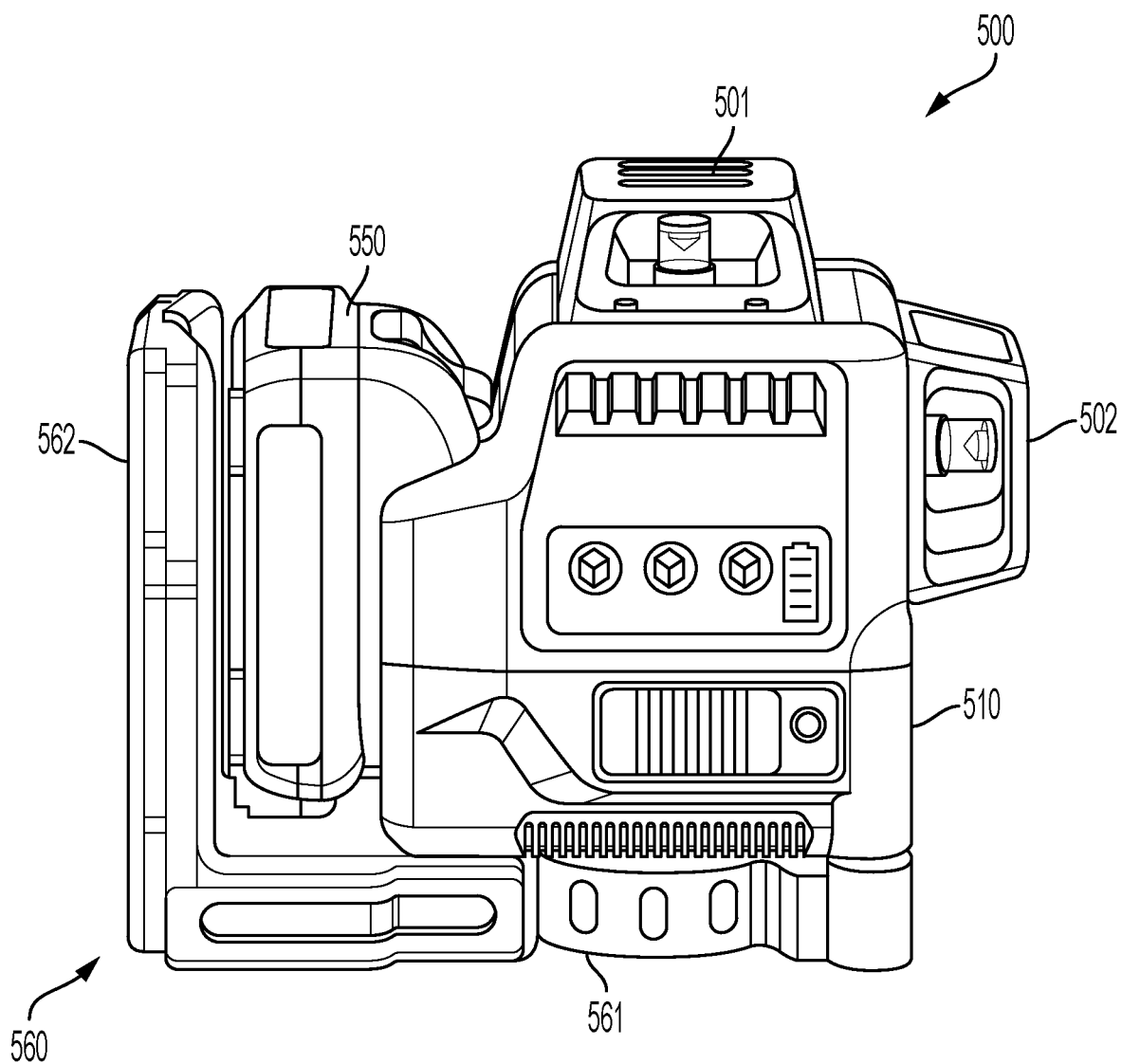
FIG. 1 illustrates a side view of a prior art laser level system.
Figure 2:
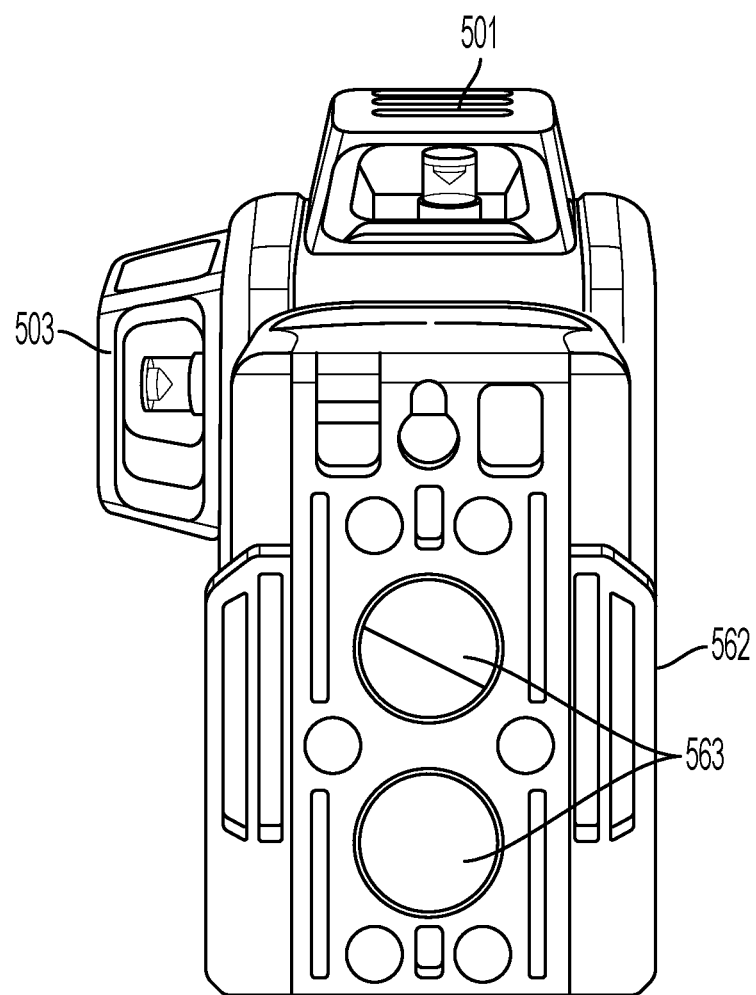
FIG. 2 is rear view of the prior art laser level system.

FIGS. 1 and 2 illustrate prior art laser level 500, which is a DEWALT12V Max 3×360 Green Line Laser DW089LG. The prior art laser level 500 is powered by a 12V Max battery pack 550 with a maximum initial battery pack voltage (measured without a workload) of 12 volts (V). Measured under a workload, the nominal voltage of the battery pack 550 is 10.8 volts (V). As shown in FIGS. 1 and 2, the laser level 500 has a housing 510 and three laser projectors 501, 502, 503. The laser projectors 501, 502 and 503 project the three laser lines. The battery pack 550 is connected to the housing 510 to provide power to laser generators which generate laser beams and thus the three laser lines. The laser level 500 is mounted on a bracket 560 with a base portion 561 and a mounting portion 562. The laser level 500 is attached to the base 561. As shown in FIG. 2, the mounting portion 562 of the bracket 560 includes two magnets 563. The magnets 563 allow the bracket 560 to be mounted to a metal beam or other metal surfaces. In the prior art laser level of FIGS. 1 and 2, the battery pack 550 is mounted to the laser housing 510.

Figure 3:
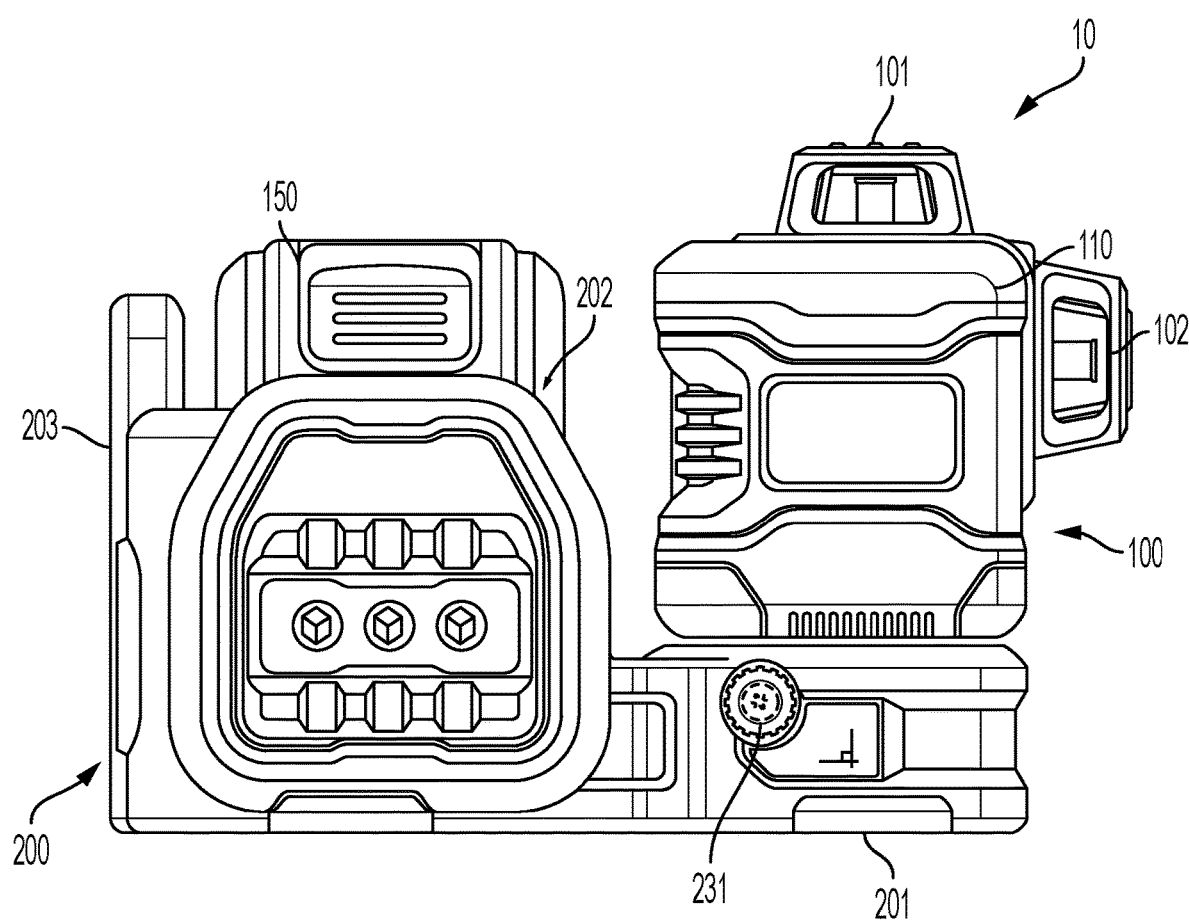
FIG. 3 is a side view of an exemplary embodiment of a laser level system according to the present application.
Figure 5:
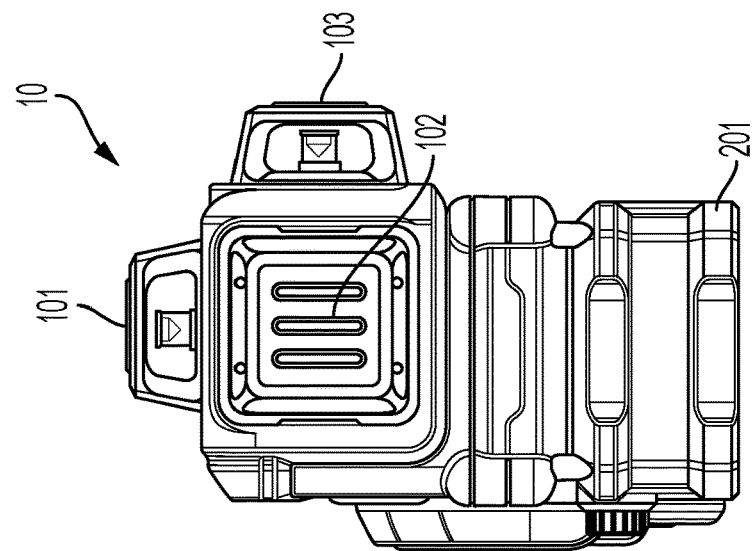
FIG. 5 is a front view of an exemplary embodiment of a laser level system according to the present application.
Figure 4:
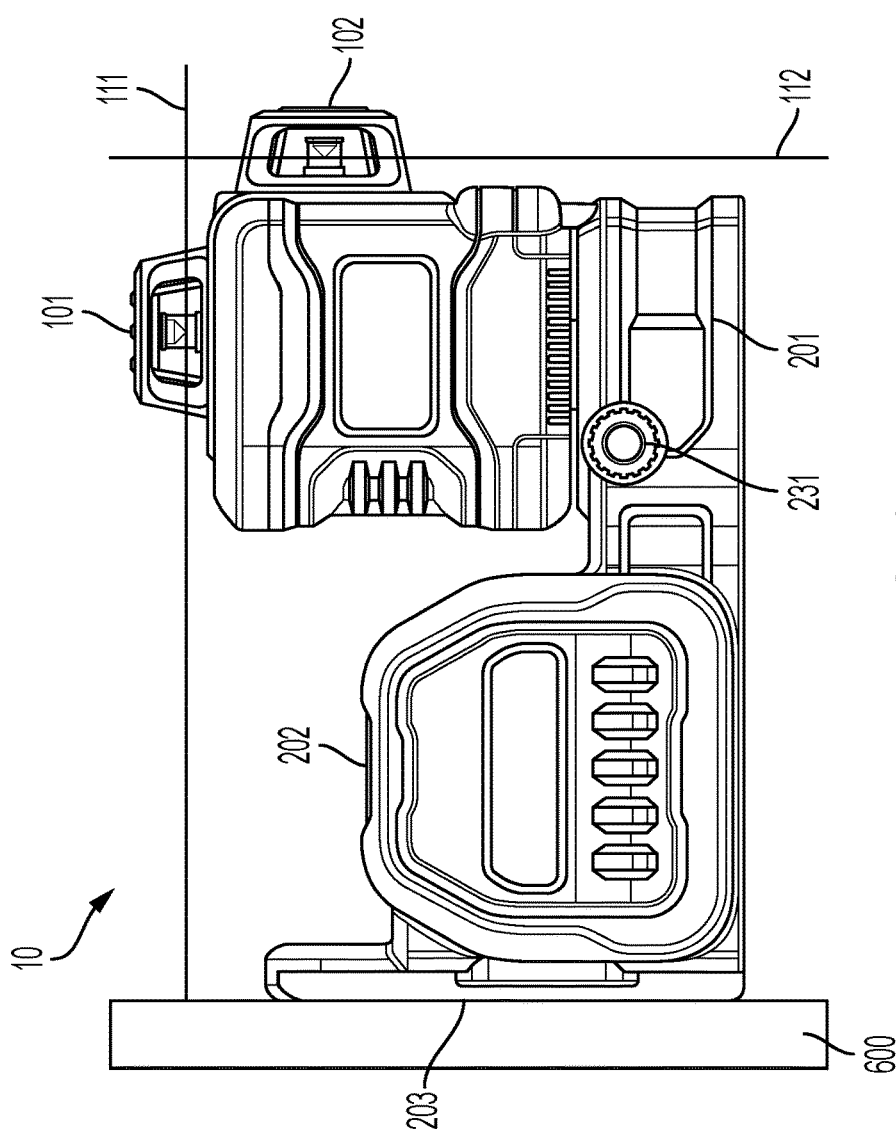
FIG. 4 is a side view of an exemplary embodiment of a laser level system according to the present application.
Figure 7:
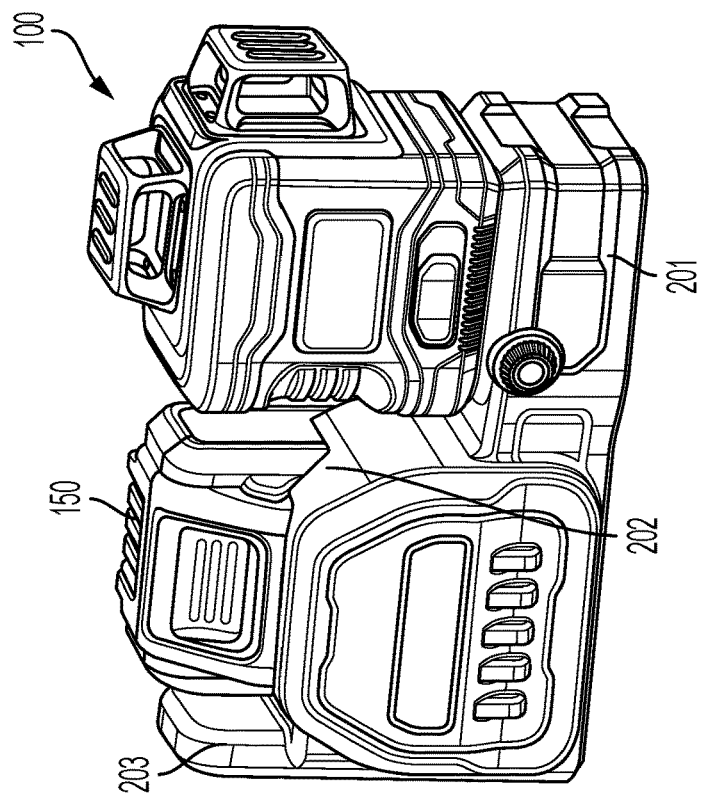
FIG. 7 is a perspective side view of an exemplary embodiment of a laser level system according to the present application.
Figure 6:
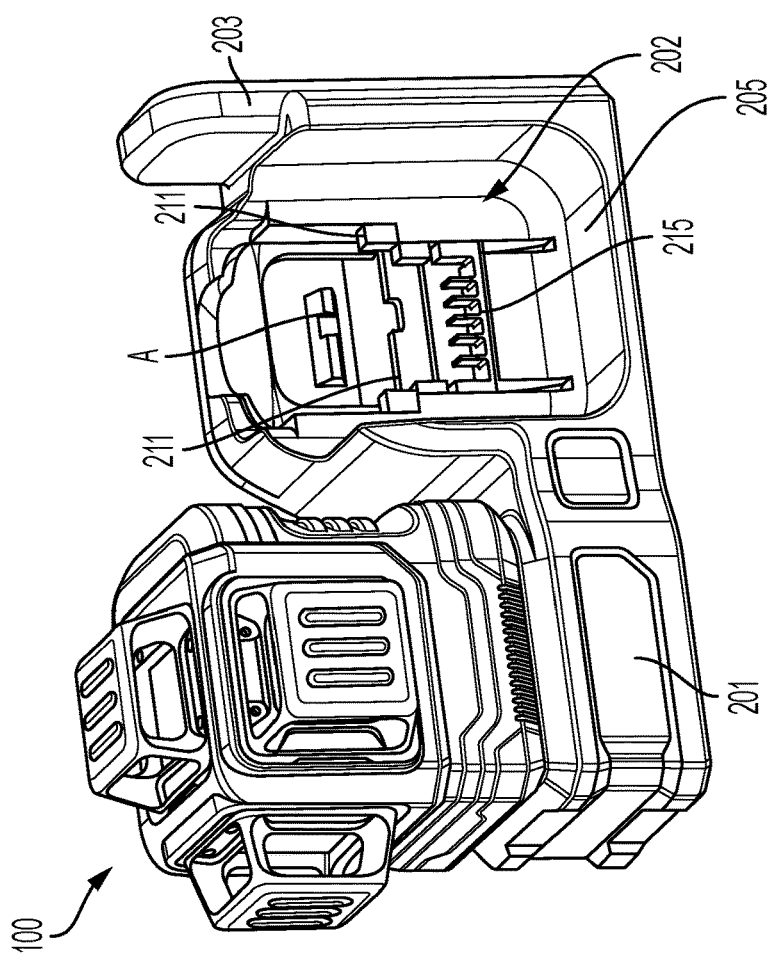
FIG. 6 is a perspective side view of an exemplary embodiment of a laser level system according to the present application.

FIGS. 3-29 illustrate non-limiting exemplary embodiments according to the present application. FIGS. 3-7 illustrate a 3×360 laser level system 10 according to an exemplary embodiment. As shown in FIG. 3, the system 10 includes a laser level 100, a bracket 200 and a battery pack 150. FIGS. 3 and 7 show the laser level system 10 with the battery pack 150 and FIGS. 4 and 6 show the system 10 with the battery pack removed.

As shown, in the laser level system 10 of FIGS. 3-7, the battery pack 150 is removably coupled to the bracket 200. This allows the weight of the battery pack 150 to be supported by the bracket 200 rather than directly on a housing 110 of the laser level 100. In turn, this allows for larger battery packs 150 to be utilized in the laser level system 10 of the present exemplary embodiment. For example, the battery pack 150 may have a higher voltage or capacity than the battery pack 550. For example, the battery pack 150 may be a 20V battery pack, having a maximum initial battery pack voltage (measured without a workload) of 20 volts (V).

The battery pack 150 may also be a 40V battery pack, having a maximum initial battery pack voltage (measured without a workload) of 40 volts (V). The battery pack 150 may have a maximum initial battery pack voltage (measured without a workload) of 80 volts or more; 50 volts or more; 40 volts or more; 30 volts or more; 20 volts or more; 18 volts or more; 16 volts or more. The battery pack 150 may have a capacity of approximately 1.5 or more amp-hours; 2 or more amp-hours; 3 or more amp-hours; or 4 or more amp-hours.

The battery pack 150 may be of a generally known power tool battery pack construction and may be compatible with other tools, such as drills, saws, sanders and impact drivers and power such tools. For example, the battery pack 150 may be of the type shown and described by U.S. Pat. Nos. 8,092,932; 7,719,234 or 6,729,413. U.S. Pat. Nos. 8,092,932; 7,719,234; and 6,729,413 are hereby incorporated by reference.

As shown in FIGS. 3-7, the bracket 200 has a base portion 201, a receptacle portion 202 and a mounting portion 203. The laser level 100 is mounted on the base portion 201. The battery pack is mounted at the receptacle portion 202 and the mounting portion 203 includes magnets for attaching the bracket 200 to a metal stud or other object, as will be discussed in further detail below.

Figure 9:
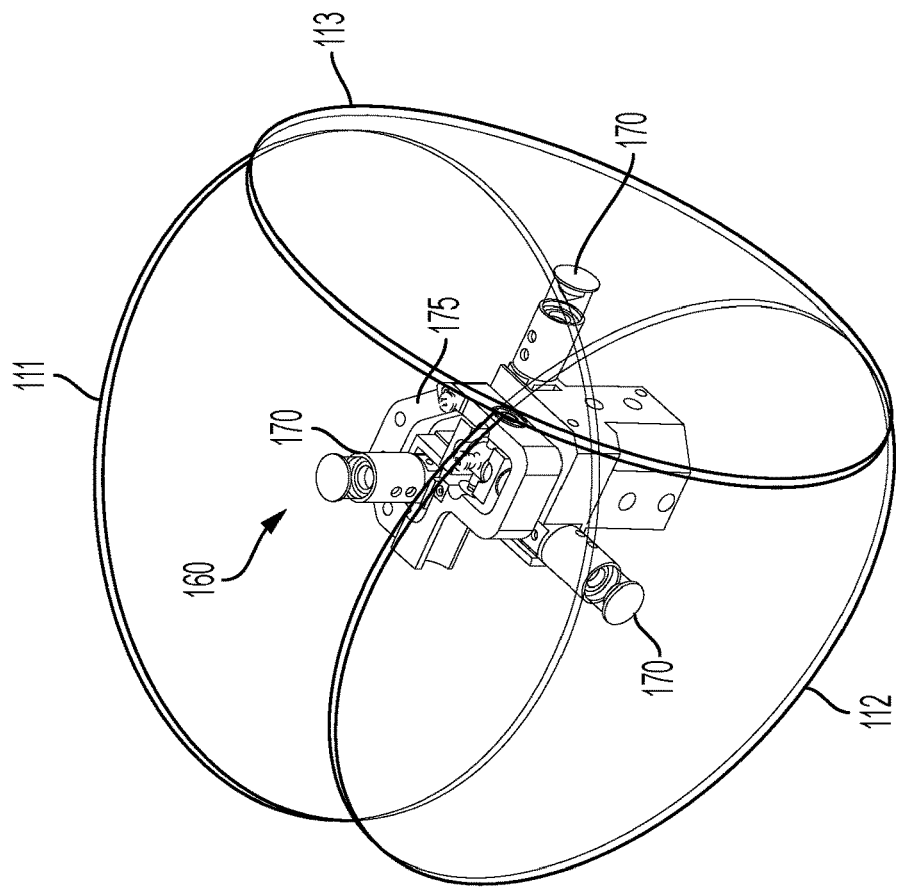
FIG. 9 is a perspective view of an exemplary embodiment of a laser module according to the present application.
Figure 8:
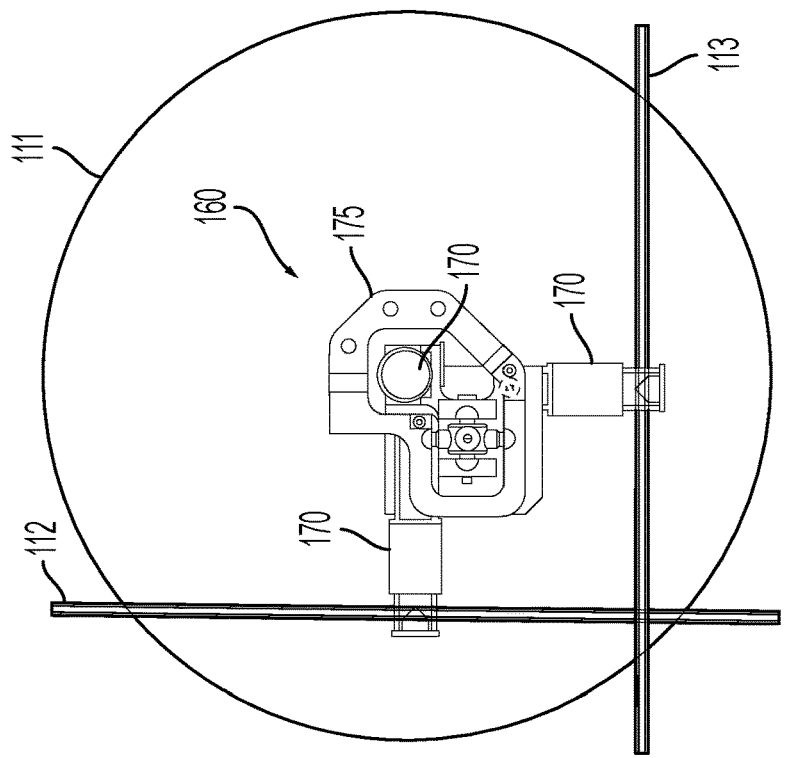
FIG. 8 is a top view of an exemplary embodiment of a laser module according to the present application.

As shown in FIGS. 3-7, the laser level 100 includes three laser projectors 101, 102 and 103. The three laser projectors project three perpendicular laser beams. FIGS. 8 and 9 illustrate a laser module assembly 160 which produces the laser lines 111, 112 and 113 that project out of the three laser projectors 101, 102 and 103, respectively. The laser module assembly 160 is housed in the housing 110 of the laser level 100. The laser module assembly 160 includes three laser modules 170. The three laser modules 170 are carried on a pendulum assembly 175. Each laser module includes a laser generator such as a laser diode and a reflector such as a cone reflector. The laser diode produces a laser beam which is reflected off the surface of the reflective cone to project laser lines 111, 112, and 113 at the three laser projectors 101, 102 and 103.

The pendulum assembly 175 rotates about a relatively small angle so that the laser modules 170 project beams in the horizontal and vertical planes when placed on a surface that is not entirely horizontally flat. For example, if the laser level 10 is placed on a surface that is sloped five degrees (5°) with respect to horizontal, the pendulum assembly 175 will tilt under the influence of gravity so that the laser modules 170 are aligned to produce a laser line 111 in a horizontal plane and laser lines 112 and 113 in vertical planes. Additionally, in some embodiments the laser level 100 includes a locking device to lock the pendulum assembly 175. In those instances the pendulum assembly 110 will be locked in a particular position rather than allowed to rotate under the influence of gravity and it may produce laser lines offset from the vertical and horizontal.

The laser lines 111, 112, 113 project out from the laser level 100 onto walls, floors ceilings or other surfaces. As there are three beams which project in a circular pattern, the laser level 100 is considered a 3×360 laser level. When the laser level assembly 10 is attached to a vertical wall at the mounting portion 203, the laser level 100 produces two vertical laser lines and one horizontal laser line. Similarly, then the laser level assembly is placed on a flat horizontal surface, the laser level 100 produces two vertical laser lines and one horizontal laser line. In some instances, the laser level 100 may be considered to be located at a front of the laser level assembly 10 and the mounting portion 203 at the back of the laser level assembly 10.

The internals and operation of laser level 100 may be the same in general as those of the laser level of U.S. Pat. No. 10,598,490. U.S. Pat. No. 10,598,490 is hereby incorporated by reference. However, unlike U.S. Pat. No. 10,598,490, in the present non-limiting exemplary embodiment, the battery pack 150 is coupled to the bracket 200 rather than directly on the laser level housing 110.

FIG. 6 illustrates the laser level assembly 10 without the battery pack 150 and provides a more detailed view of the receptacle portion 202 of the bracket 200. As shown in FIG. 6, the receptacle portion 202 includes a cavity 205 which is a space for receiving the battery pack 150. The receptacle portion 202 also includes a pair of rails 211 for guiding the battery pack 150 and an electrical connector 215. The battery pack 150 is inserted into the receptacle portion 202 in the direction A. The rails 211 guide the battery pack 150 into the cavity 205 and into engagement with the electrical connector 215. Power is provided by the battery pack 150 through the electrical connector. As discussed further below, wires carry power from the battery pack 150 to the laser level 110 to power the laser modules 170, in particular the laser diodes of the laser modules 170. FIGS. 3 and 7 illustrate the laser level system 10 with the battery pack 150 in a coupled or inserted position.

Figure 11:
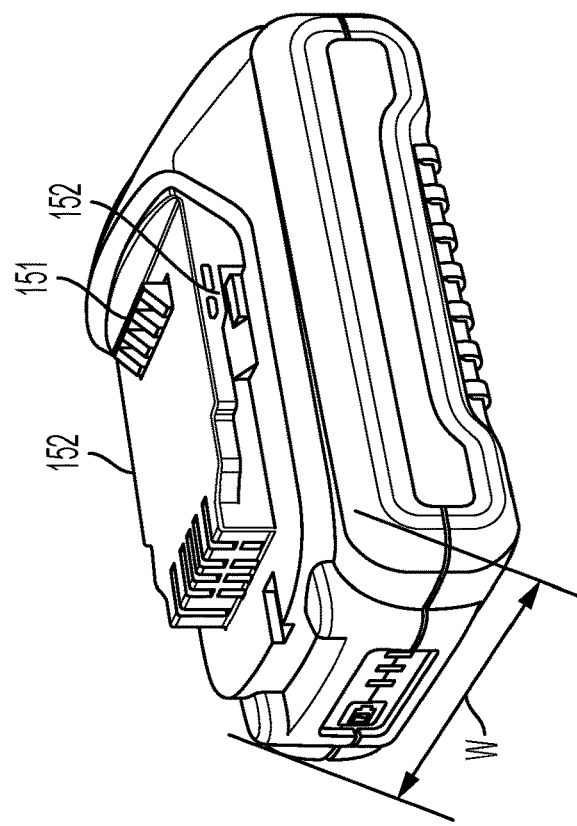
FIG. 11 is a perspective view of an exemplary embodiment of a battery pack.
Figure 10:
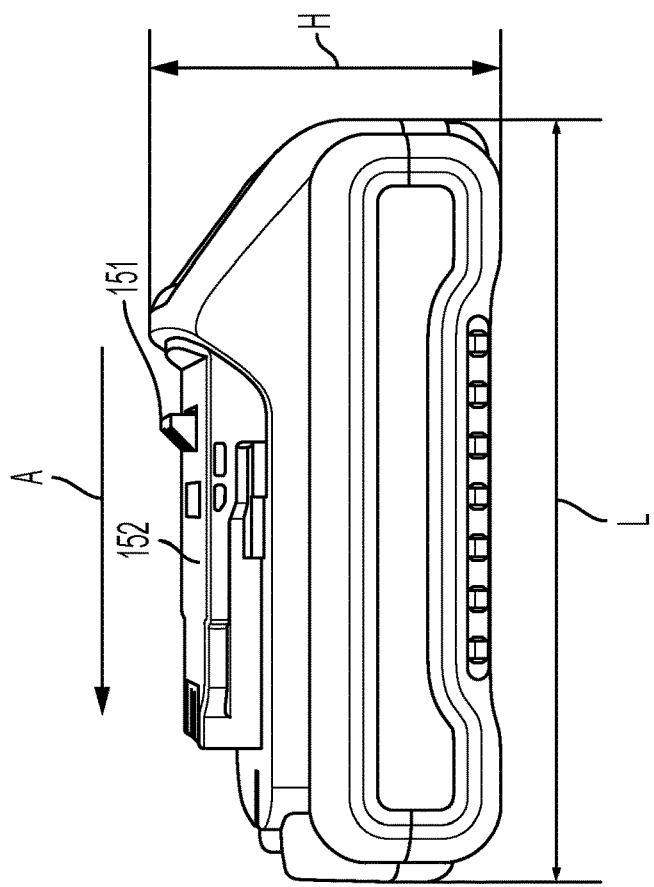
FIG. 10 is a side view of an exemplary embodiment of a battery pack.

FIGS. 10 and 11 illustrate the battery pack 150 that can be used with the laser level 100. As shown in FIGS. 10 and 11, the battery pack 150 has a length L, a height H and a width W. The battery pack 150 is inserted into the receptacle portion 202 of the bracket 200 in the direction A. The battery pack 150 includes a pair of rails 152 which help to guide insertion and also a latch 151 which assists in latching the battery pack 150 in place.

Figure 13:
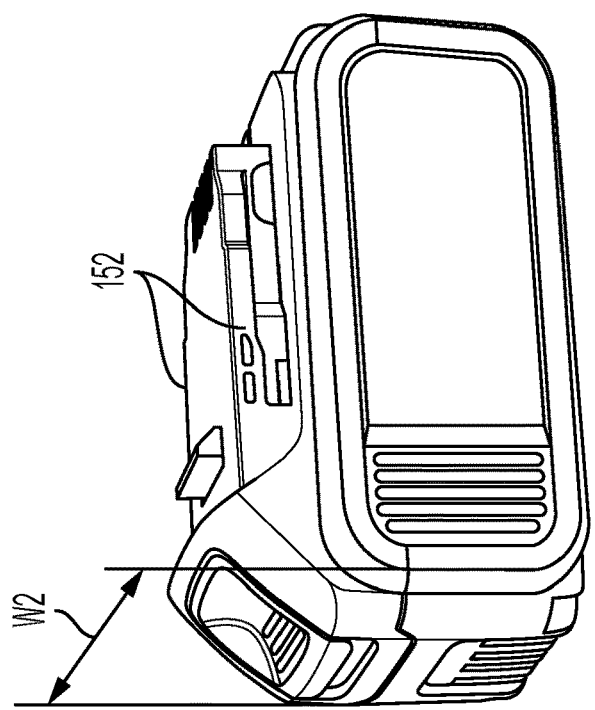
FIG. 13 is a perspective view of an exemplary embodiment of a battery pack.
Figure 12:
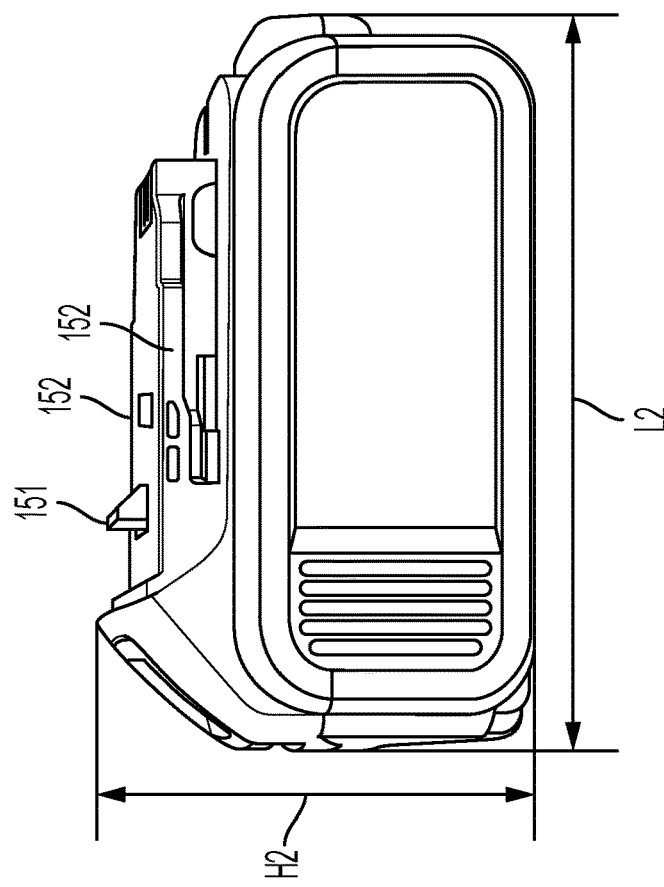
FIG. 12 is a side view of an exemplary embodiment of a battery pack.

FIGS. 12 and 13 illustrate another battery pack 150'. The battery pack 150' is the same as battery pack 150, except that it has a greater size and capacity. In particular, it may have more battery cells and a higher capacity. For example, battery pack 150 may have a capacity of 2 amp-hours and battery pack 150' may have a capacity of 4 amp-hours. The battery pack 150' has a length L2, a height H2 and a width W2. Either battery pack 150 or battery pack 150' may be used to power the laser level 100 or any of the exemplary embodiments of the laser level system 10, 10', 10" described in the present application.

As shown in, for example, FIGS. 3 and 7, the battery pack 150 is inserted into the bracket 200 sideways. That is, the width W of the battery pack 150 (or W2 of 150') is between the mounting portion 203 and the laser level 100. In the case of the battery pack 150, the width W is greater than the height H, which provides more spacing between the mounting portion 203 and the laser level. Additionally, because the width W and width W2 are the same or similar, it allows for the same receptacle portion 202 to receive either of battery pack 150 or 150'.

FIGS. 14 and 15 illustrate the laser level assembly 10 with both battery packs 150 and 150' shown and in different rotational positions. As shown in FIGS. 14 and 15, the laser level 100 may rotate with respect to the bracket 200. Additionally, the mount receptacle portion 202 may accept either the battery pack 150 or 150', with the battery pack 150' having a greater height H2 than the height H of battery pack 150. The laser level assembly 10 may be constructed so that the laser beams may be unobstructed in various positions. For example, as shown in FIG. 14, the laser beam 113 is not blocked by either the battery pack 150 or the battery pack 150'. Instead, the laser beam 113 may project on a metal stud or wall 600 with metal stud on which the laser level assembly 10 is held without obstruction by the battery packs 150 or 150'.

Figure 16:
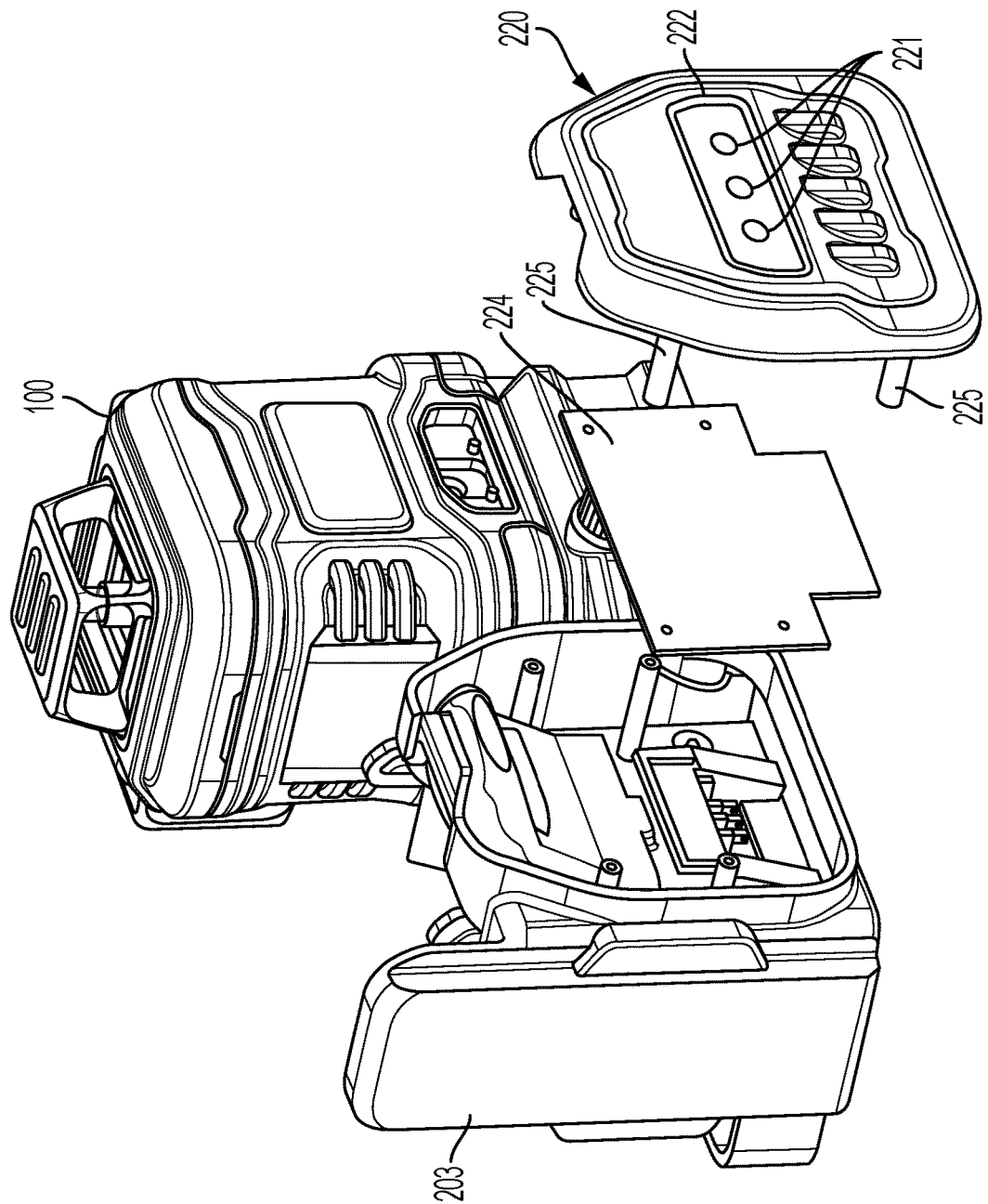
FIG. 16 is a partially exploded perspective view of an exemplary embodiment of a laser level system according to the present application.

As shown in various Figs., the bracket 200 of the exemplary embodiment includes a user interface (UI) 220. The user interface 220 may include a plurality of buttons 221 and or a display 222. The buttons 221 may be used to control operations of the mount or the laser level 100. For example, the buttons 221 may be used to turn the laser level 100 on and off. It may be used to turn individual laser beams of the laser level 100 on and off. It may be used to allow or disable remote control or change the power of the laser beams. It may also be used for other known functions of the laser level, mount or a laser level and mount system. The display 222 may be used to display information to a user including, but not limited to, whether the laser level is on or off, battery life for the battery pack 150/150', whether a remote control is active, or other information that may be informative or useful to a user. FIG. 16 illustrates the user interface 220 in an exploded view. As shown there, the user interface 220 houses a printed circuit board (PCB) 224 and a housing of the interface 220 is secured to the rest of the bracket 200 via screws 225.

Figure 17:
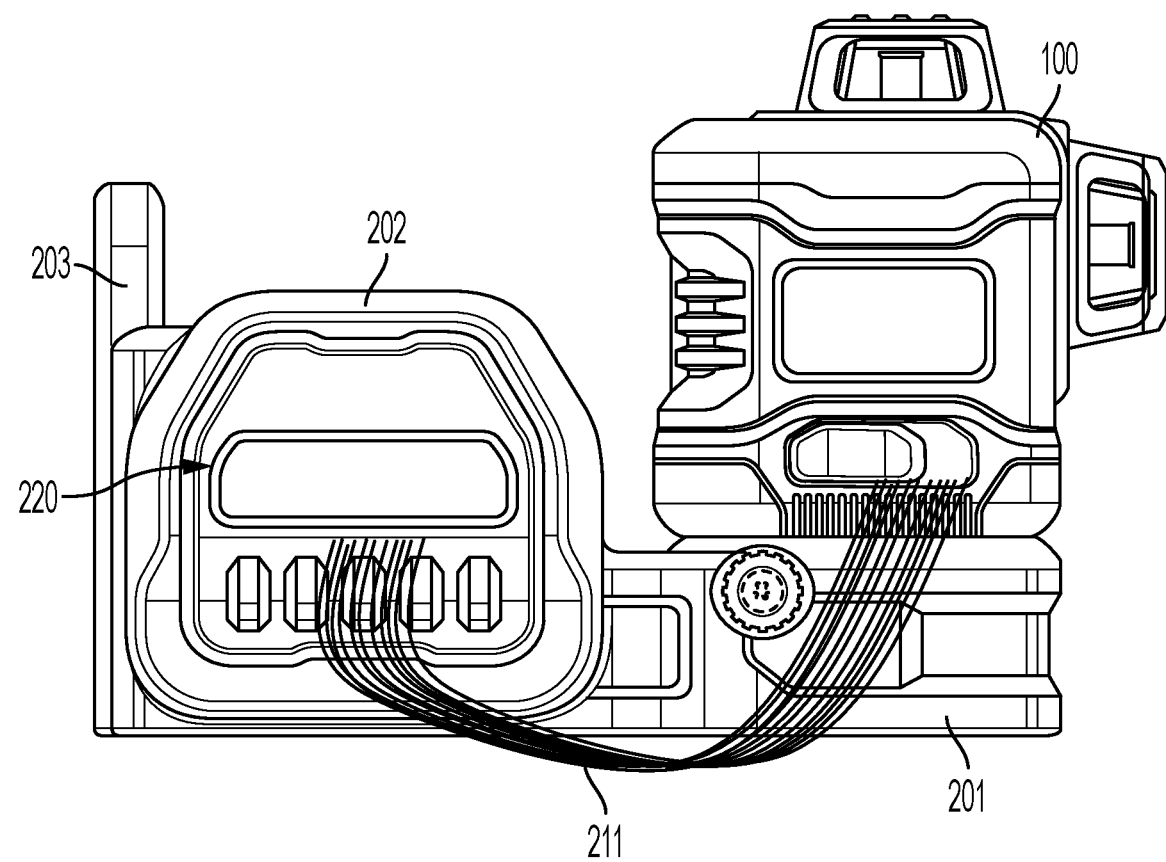
FIG. 17 is a side view of an exemplary embodiment of a laser level system according to the present application.
Figure 18:
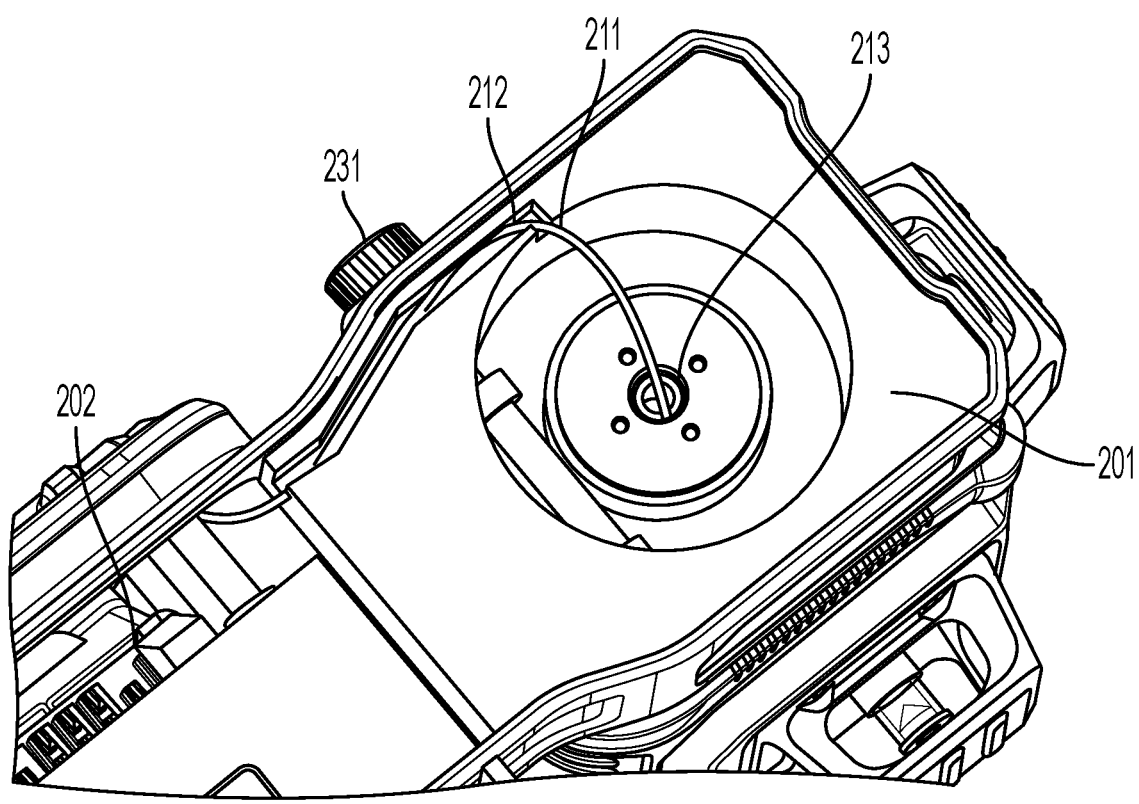
FIG. 18 is a close-up bottom perspective view of a portion of an exemplary embodiment of a laser level system according to the present application.
Figure 20:
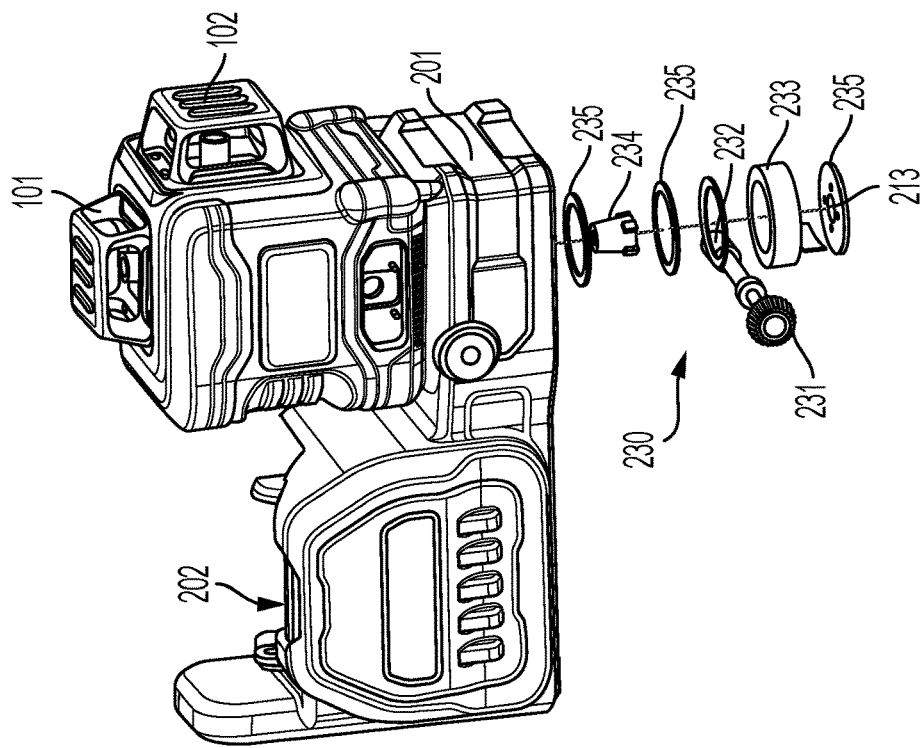
FIG. 20 is a close-up, partially exploded, side perspective view of a portion of an exemplary embodiment of a laser level system according to the present application.
Figure 19:
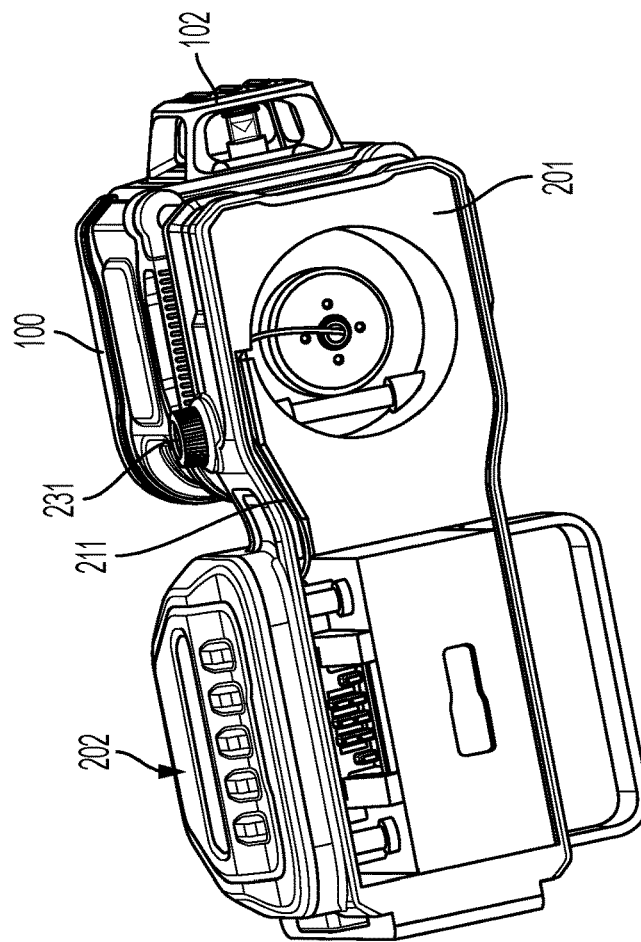
FIG. 19 is a perspective bottom view of an exemplary embodiment of a laser level system according to the present application.

FIG. 17 illustrates an electrical connection between the battery receptacle portion 202 and the laser level 100. As discussed above, the battery receptacle 202 of the bracket 200 receives the battery pack 150 (or 150') and power from the pack is delivered to the laser level 100. Although shown exposed for purposes of illustration in FIG. 17, the wires 211 delivering power from the battery pack 150 to the laser level 100 are housed at least mostly within the bracket 200. For example, FIGS. 18-20 illustrate how a wire 211 can be more integrated into the bracket 200. In particular, the wire 211 travels in a groove 212 from the receptacle portion 202 to the base portion 201. There is a hole in the base portion 201 that is at a central axis of rotation of the laser level 100. The wire 211 travels through the hole 213 through a hole at the bottom of the laser level housing 110 and is hard wired into the laser level 100 to provide power for the laser level. A housing cover piece may be added over the bottom of the mount shown in FIG. 18.

FIG. 20 illustrates the rotary adjustment assembly 230 is shown in an exploded view. As shown, there is a user actuatable knob 231 which the user can rotate. The knob 231 is at one end of a shaft and there is a geared part 232 on the shaft which interacts with gear 233. Accordingly, rotation of the knob 231 rotates the gear 233. The gear 233 is connected to connection part 234 which rotates with the gear 233 connects to the laser level 100. The connection part 234 is connected to the laser level 100 and the laser level 100 thus rotates when a user rotates the knob 231. As shown, the assembly 230 also includes a variety of washer pieces 235 for securing the parts. The hole 213 for threading wire 211 is shown in the bottom washer part 235.

Figure 21:
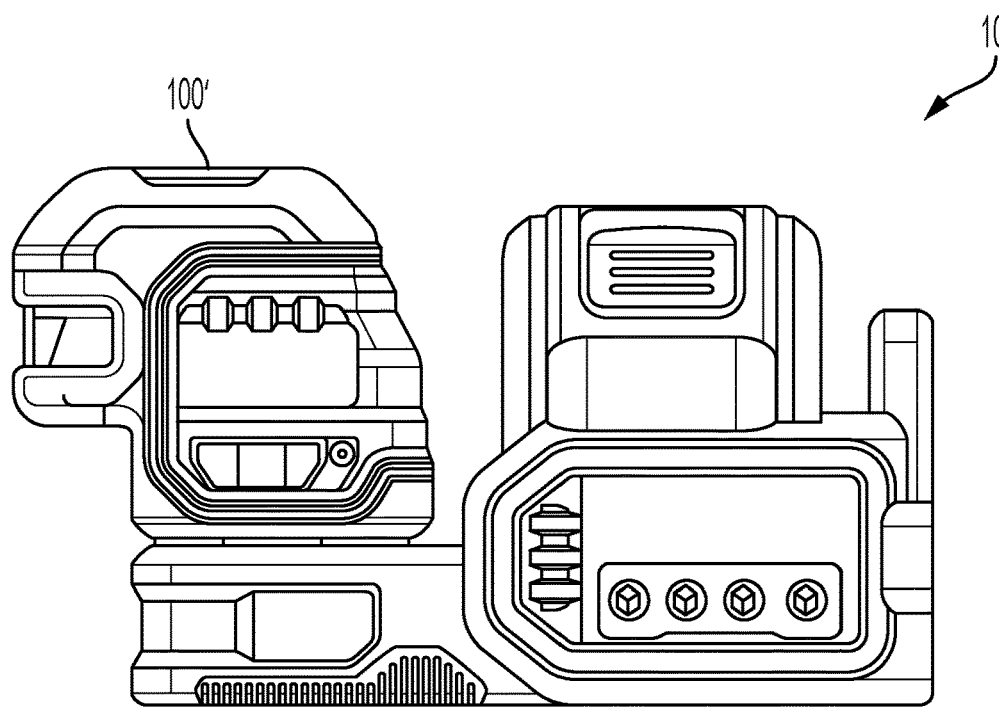
FIG. 21 is a side view of an exemplary embodiment of a laser level system according to the present application.
Figure 22:
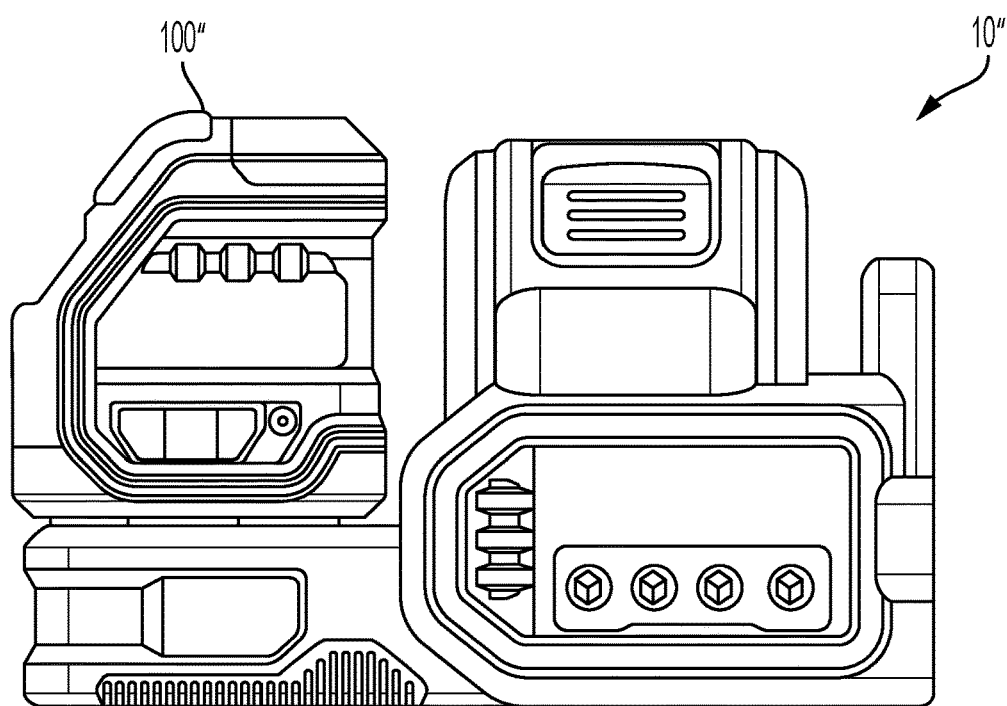
FIG. 22 is a side view of an exemplary embodiment of a laser level system according to the present application.

According to other non-limiting exemplary embodiments, a different type of laser level may be used in the laser level assembly, such as is shown in FIGS. 21 and 22. For example, laser level assembly 10' of FIG. 21 illustrates a spot laser level 100'. The spot laser level 100' projects five laser spots, which may include up, down, left, right and forward. FIG. 22 illustrates a laser level system 10" with a cross line laser level 100". The cross-line laser level 100" produces two perpendicular beams which intersect. In particular, the cross-line laser level projects 100" a horizontal beam and a vertical beam. The systems 10' and 10" may otherwise be the same as the system 10 described above. Additionally, other types of laser levels may be used including a variety of different beams or dots.

Figure 23:
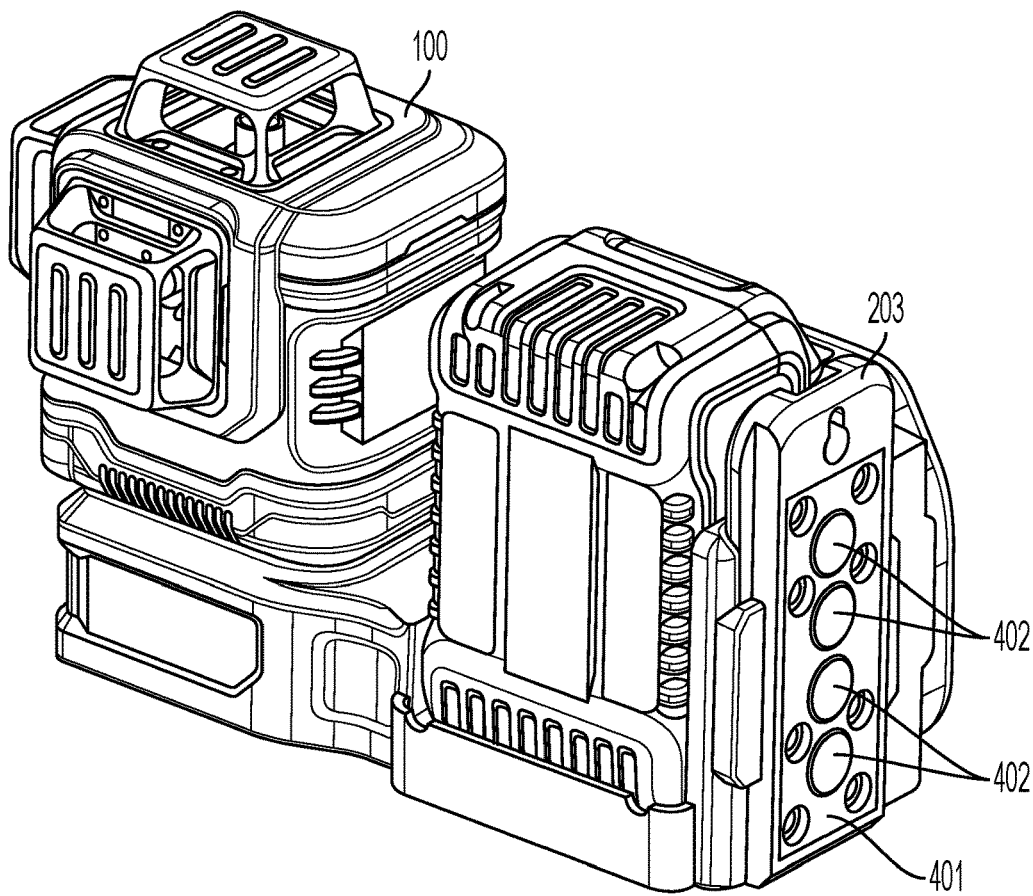
FIG. 23 is a side perspective view of an exemplary embodiment of a laser level system according to the present application.
Figure 24:
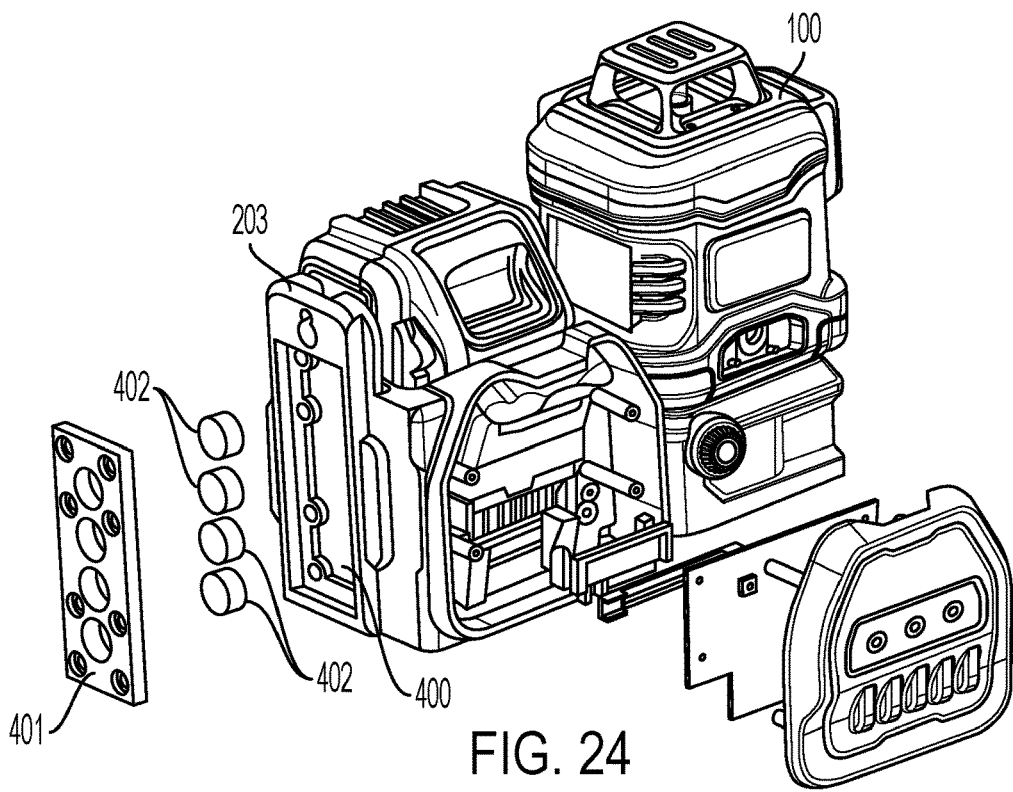
FIG. 24 is a partially exploded side perspective view of an exemplary embodiment of a laser level system according to the present application.
Figure 25:
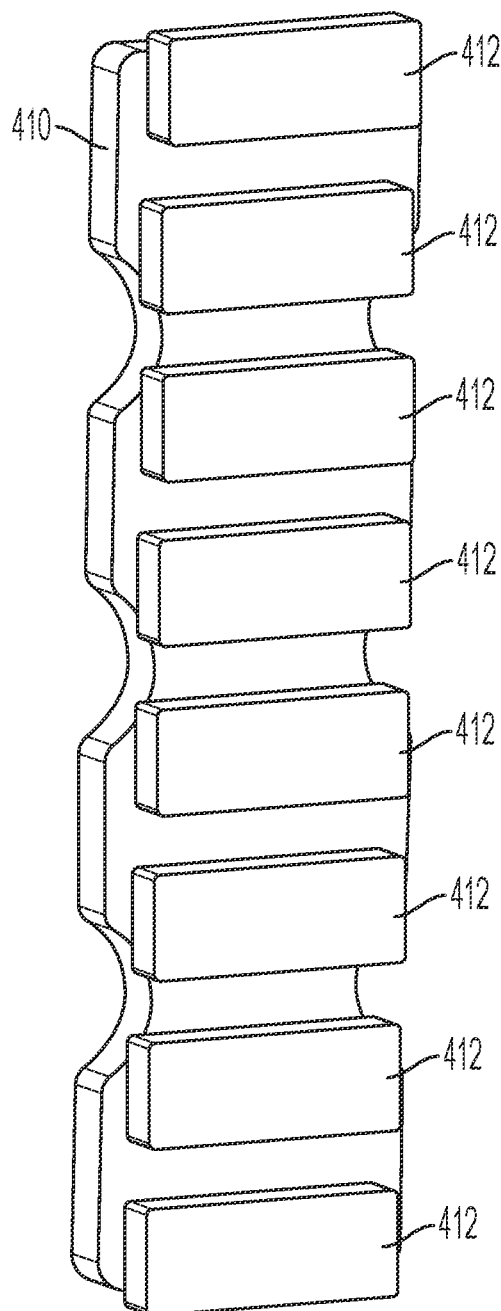
FIG. 25 is a perspective view of an exemplary embodiment magnet assembly according to the present application.
Figure 26:
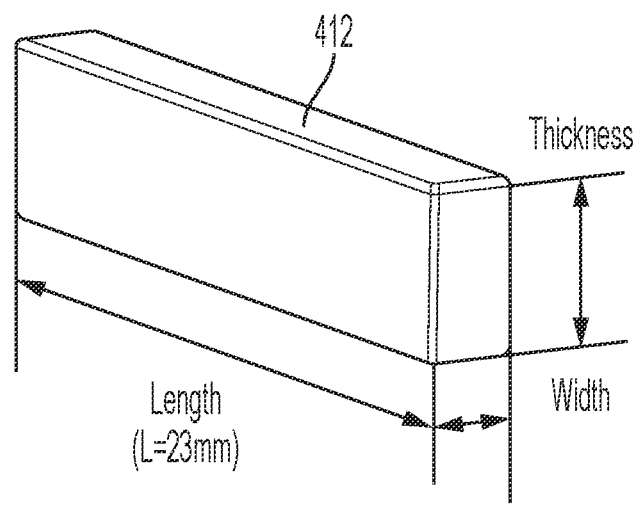
FIG. 26 is a perspective view of an exemplary embodiment magnet according to the present application.
Figure 27:
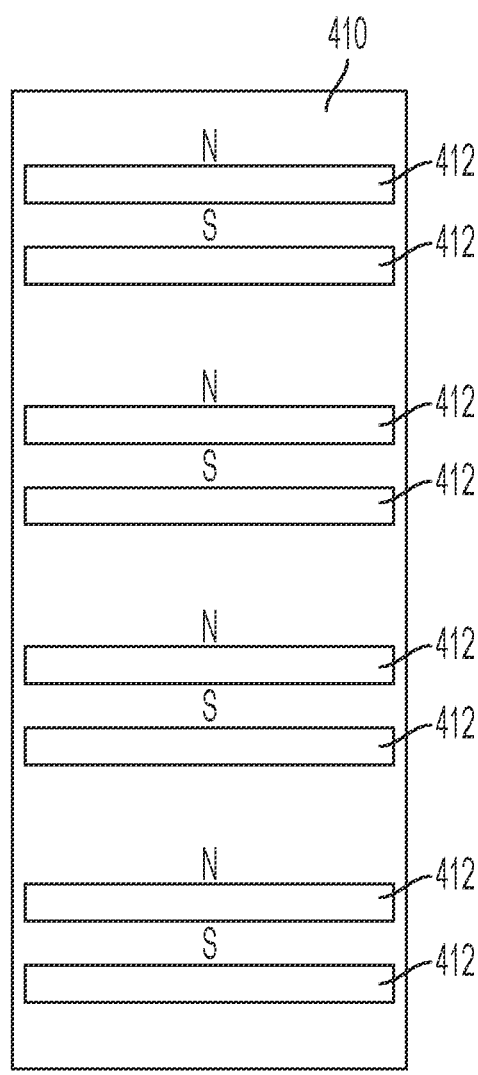
FIG. 27 is a front schematic view of an exemplary embodiment magnet assembly according to the present application.
Figure 28:
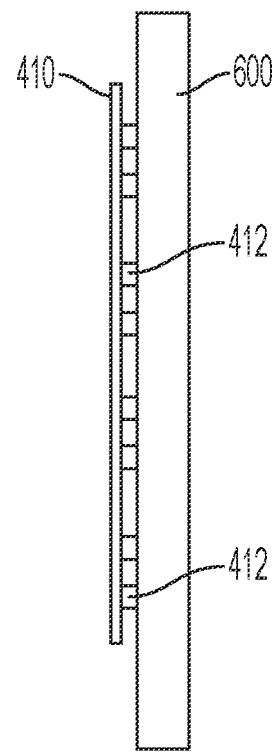
FIG. 28 is a side schematic view of an exemplary embodiment magnet assembly according to the present application.

FIGS. 23-28 illustrate the mounting portion of the bracket 200. FIGS. 23 and 24 illustrate the mounting portion 203 in an assembled position and FIG. 24 illustrates the mounting portion 203 in an exploded view. As shown in FIGS. 23 and 24, the mounting portion 203 includes a metal plate 400, four magnets 402 and a securing plate 401. The securing plate is screwed into the bracket 200 and secures the magnets 402 in the position shown in FIG. 23. The magnets 402 along with the plate 400 provide a magnetic force which allows the bracket 200 to be secured to metal studs, including those behind walls (such as wall 600 which is metal or includes a metal component behind the wall surface). In the embodiment shown in FIGS. 23 and 24, there are four magnets 402 and the magnets are cylindrical. FIGS. 25-28 illustrate an alternative magnet arrangement. FIG. 25 illustrates a plate 410 and magnet 412 assembly. FIG. 26 illustrates a single magnet 412. FIGS. 27 and 28 illustrate the alternative magnet arrangement schematically. The plate 410 and magnets 412 would be used in place of the plate 400 and magnets 402 in FIGS. 23 and 24. A cover which corresponds to the location and shapes of the magnets 412 shown in FIG. 25 would be used in place of the cover 401 in the alternative magnet arrangement.

As shown in FIGS. 25 and 26, the alternative magnet arrangement includes rectangular cuboid magnets 412. As shown in FIG. 25, there may be eight magnets 412. In some embodiments, there may be at least six magnets 412, at least seven magnets 412 or at least eight magnets 412. Additionally, the magnets 412 may be spaced equidistantly apart, as shown in FIG. 25, or north/south pairs of magnets 412 may be placed closer together, as in FIG. 27.

As shown in the schematic of FIG. 27, the eight magnets 412 may consist of four pairs of magnets 412. Each pair has opposite facing polarity, forming four north/south pairs of magnets 412.

In some instances, using large magnets may provide a large magnetic force if the bracket 200 is placed against a large/thick piece of metal and a small force if placed against a small/thin piece of metal. This can cause the bracket 200 to fail to adequately attach to the thin piece of metal if small magnets are used. On the other hand, if large magnets are used, the bracket 200 may adequately attach to a small/thin piece of metal but stick to a large/thick piece of metal with too much force, causing it to be difficult to remove. The design provided FIGS. 25 and 26 using the eight rectangular cuboid magnets 412 helps to alleviate these problems. For example, utilizing the eight magnets 412 shown in FIG. 25 provides for eight small poles. This provides for a significant reduction in the flux as compared to using four magnets. Additionally, making the shape of the magnets 412 as having rectangular cross sections (being rectangular cuboids) spreads the flux over a wider area. This makes it such that the bracket 200 sticks to a thick and a thin wall with similar amounts of force. In turn, the magnets 412 can be sized to adequately stay attached to a thin metal object while not attaching too strongly to a thick metal object.

While the invention has been described by way of exemplary embodiments, it is understood that the words which have been used herein are words of description, rather than words of limitation. Although the description provided above provides detail for the purpose of illustration based on what is currently considered to be the most practical and preferred embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A laser level system, comprising:
a line laser level; and
a bracket;
wherein the bracket includes a base portion, a battery pack receptacle portion and a mounting portion;
wherein the line laser level is rotatably mounted to the base portion;
wherein the mounting portion is transverse to the base portion and configured to be mounted on a structure;
wherein the battery pack receptacle portion is configured to selectively receive a first battery pack with a first number of battery cells and a second battery pack with a second number of battery cells;
wherein the first number of battery cells is at least 1.5 times as many as the second number of battery cells.

2. The laser level system of claim 1, wherein the first number of battery cells is at least 2 times as many as the second number of battery cells.

3. The laser level system of claim 1, wherein the first battery pack may have a capacity of at least 4 amp hours.

4. The laser level system of claim 1, wherein the line laser level is rotatable about a rotational axis; and
wherein the rotational axis is generally parallel to the mount portion.

5. The laser level system of claim 1, wherein the line laser level is configured to project at least two laser lines.

6. The laser level system of claim 5, wherein the at least two laser lines comprise a horizontal line and a vertical line.

7. The laser level system of claim 6, further comprising an electrical connection from the battery pack mounting portion through the base portion to the line laser level.

8. The laser level system of claim 7, wherein the electrical connection is provided by a wire.

9. The laser level system of claim 1, wherein the mounting structure includes at least one magnet.

10. The laser level system of claim 1, wherein the mounting portion includes a metal plate, at least four magnets, and a securing plate.

11. The laser level system of claim 1, wherein the battery pack receptacle portion includes an electrical connector configured to selectively engage the first battery pack and the second battery pack; and
wherein the battery pack further includes a pair of rails configured to selectively guide the first battery pack and the second battery pack into engagement with the electrical connector.

12. The laser level system of claim 11, wherein the pair of rails are parallel to one another.

13. The laser level system of claim 1, wherein a central plane of the mounting structure is transverse to a central plane of the battery pack receptacle portion.

14. The laser level system of claim 1, wherein the battery pack receptacle portion is disposed between the line laser level and the mounting portion.

15. A laser level system, comprising:
a laser level; and
a bracket;
wherein the bracket includes a base portion, a battery pack receptacle portion and a mounting portion;
wherein the laser level is rotatably mounted to the base portion;
wherein the mounting portion is transverse to the base portion and configured to be mounted on a structure;
wherein the battery pack receptacle portion is configured to receive a battery pack;

wherein the laser level is configured to project a least two laser lines.

16. The laser level system of claim 15, wherein the at least two laser lines comprise a horizontal line and a vertical line.

17. The laser level system of claim 16, further comprising an electrical connection from the battery pack mounting portion through the base portion to the laser level.

18. The laser level system of claim 17, wherein the mounting structure includes at least one magnet.

19. The laser level system of claim 18, wherein the laser level is rotatable about a rotational axis; and
   wherein the rotational axis is generally parallel to the mount portion.

20. A laser level system, comprising:
   a laser level; and
   a bracket;
   wherein the bracket includes a base portion, a battery pack receptacle portion and a mounting portion;
   wherein there is an electrical connection from the battery pack mounting portion through the base portion to the laser level;
   wherein the laser level is rotatably mounted to the base portion;
   wherein the mounting portion is transverse to the base portion and configured to be mounted on a structure;
   wherein the battery pack receptacle portion is configured to selectively receive a first battery pack with a first number of battery cells and a second battery pack with a second number of battery cells;
   wherein the first number of battery cells is at least 1.5 times as many as the second number of battery cells;
   wherein the laser level is configured to project a least two laser lines; and wherein the mounting structure comprises a plurality of magnets.

* * * * *